US009686357B1

(12) United States Patent
Waldrep et al.

(10) Patent No.: US 9,686,357 B1
(45) Date of Patent: Jun. 20, 2017

(54) MAPPING CONTENT DELIVERY

(71) Applicant: Palantir Technologies Inc., Palo Alto, CA (US)

(72) Inventors: William Waldrep, Palo Alto, CA (US); John Carrino, Redwood City, CA (US); Peter Wilczynski, San Francisco, CA (US); Daniel Paquette, Ashburn, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/349,794

(22) Filed: Nov. 11, 2016

Related U.S. Application Data

(60) Provisional application No. 62/369,977, filed on Aug. 2, 2016.

(51) Int. Cl.
*G06F 15/16* (2006.01)
*G06F 15/173* (2006.01)
*H04L 29/08* (2006.01)
*H04L 29/06* (2006.01)

(52) U.S. Cl.
CPC .......... *H04L 67/1095* (2013.01); *H04L 67/18* (2013.01); *H04L 67/42* (2013.01)

(58) Field of Classification Search
USPC ....... 709/203, 205, 206, 217, 219, 223, 224, 709/226, 228, 232, 238; 707/807; 701/457; 382/113; 1/1
See application file for complete search history.

(56) References Cited

U.S. PATENT DOCUMENTS

| 8,103,441 | B2 * | 1/2012 | Callaghan | G01C 21/26 701/457 |
|---|---|---|---|---|
| 8,774,470 | B1 * | 7/2014 | Schmidt | G06K 9/0063 382/113 |
| 9,201,898 | B2 * | 12/2015 | Chawathe | G06F 17/30241 |
| 9,396,508 | B2 * | 7/2016 | Otero | G06T 9/00 |
| 9,424,673 | B2 * | 8/2016 | Otero | G06T 11/20 |
| 2011/0055290 | A1 * | 3/2011 | Li | G06F 17/30241 707/807 |
| 2015/0186443 | A1 * | 7/2015 | Ito | G06F 17/30241 709/203 |

* cited by examiner

*Primary Examiner* — Quang N Nguyen
(74) *Attorney, Agent, or Firm* — Schwegman Lundberg & Woessner, P.A.

(57) ABSTRACT

Aspects of the present disclosure relate to mapping content delivery. A client device provides, to a map management server, a request for a map of a geographic region. The client device receives, from the map management server, an identification of tiles for the map. The client device provides, to a first tile server, a request for the tiles for the map. In response to receiving the tiles from the first tile server: the client device displays the map of the geographic region based on the tiles.

17 Claims, 4 Drawing Sheets

MAPPING CONTENT DELIVERY

PRIORITY CLAIM

This application claims priority to U.S. Provisional Patent Application No. 62/369,977, filed on Aug. 2, 2016, entitled "MAPPING CONTENT DELIVERY," the entire content of which is incorporated herein by reference.

TECHNICAL FIELD

The subject matter disclosed herein relates to content delivery to a client device. In particular, example embodiments may relate to delivering, to a client device, a map requested at the client device.

BACKGROUND

A mapping application of a client device may access maps based on tiles that are stored on several different tile servers. One challenge is selecting an appropriate tile server to use to generate a requested map, as the tiles for the map may be stored at multiple different tile servers.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As noted above, a mapping application of a client device may access maps based on tiles that are stored on several different tile servers. One challenge is selecting an appropriate tile server to use to generate a requested map, as the tiles may be stored at multiple different tile servers. In some cases, the mapping application may be used to reduce the latency between a time when the request is provided to the tile server(s) and a time when the tiles are provided to the client device. In some aspects, the mapping application resides at the client device.

As used herein, the terms "tile" or "map tile" encompass their plain and ordinary meaning. A tile may store a portion of a map at a given zoom level as an image taking up a predefined area measured in pixels (e.g., 256 pixels by 256 pixels). In one example, a first tile includes a map of the United States showing only major cities and major interstate highways. A second tile includes a map of California showing large and mid-sized cities with interstate and major state highways. A third tile includes a map of San Francisco showing its largest streets. A fourth tile includes a map of the Marina neighborhood of San Francisco and shows all of the streets, parks, and major landmarks in that neighborhood. Additional tiles may be used to overlay the map of the Marina neighborhood (or other maps) with topography, business names and geographic locations, real estate prices, and the like.

Figure 1:
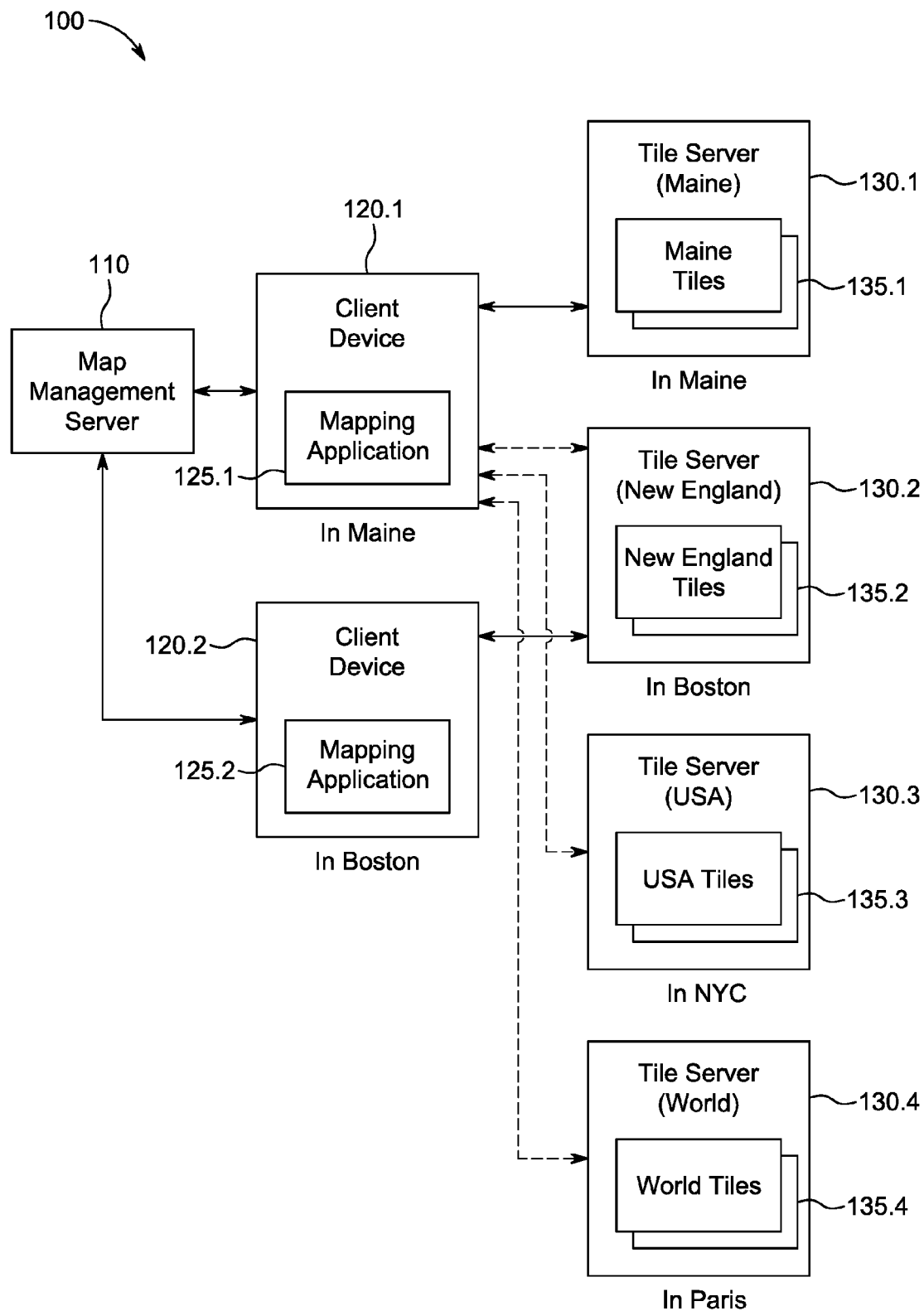
FIG. 1 is a block diagram of an example system in which mapping content is delivered, according to some embodiments.

FIG. 1 is a block diagram of an example system 100 in which mapping content is delivered. As shown, the system 100 includes a map management server 110, a client device 120.1 geographically located in Maine, a client device 120.2 geographically located in Boston, Mass., a tile server 130.1 for Maine geographically located in Maine, a tile server 130.2 for New England geographically located in Boston, a tile server 130.3 for the United States of America (USA) geographically located in New York City (NYC), and a tile server 130.4 for the world geographically located in Paris, France.

Each client device 120.$a$ (where $a$ is a number between 1 and 2) includes a mapping application 125.$a$. The mapping application 125.$a$ is configured to receive a request for a map of a geographic region, determine (e.g., by consulting the map management server 110, as discussed below) which tiles are required to generate a map of a geographic region, and to display the map of the geographic region. More details of the operation of the mapping application 125.$a$ are provided in conjunction with FIGS. 2A-2B.

The Maine tile server 130.1 includes tiles 135.1 for Maine. The New England tile server 130.2 includes tiles 135.2 for New England. The USA tile server 130.3 includes tiles 135.3 for the USA. The world tile server 130.4 includes tiles 135.4 for the world. In FIG. 1, aspects of the subject technology are illustrated in conjunction with one map management server 110, two client devices 120, and four tile servers 130. However, the subject technology may be implemented with any number of map management server(s) 110, client devices 120, or tile servers 130. The tiles 135.$b$ (where $b$ is a number between 1 and 4) of the tile servers 130.$b$ may be stored at a predetermined zoom level or at multiple different zoom levels. In one example embodiment, the world tiles 135.4 include the USA tiles 135.3 and other tiles. The USA tiles 135.3 include the New England tiles 135.2 and other tiles. The New England tiles 135.2 include the Maine tiles 135.1 and other tiles. (New England includes the states of Maine, New Hampshire, Vermont, Massachusetts, Rhode Island, and Connecticut.) Thus, the world tile server 130.4 occupies more memory than the USA tile server 130.3, which occupies more memory than the New England tile server 130.2, which occupies more memory than the Maine tile server 130.1. As set forth above, in some aspects, each tile server 130.1-4 stores geographic information (e.g., tiles) for a different geographic area.

The map management server 110 is configured to receive, from a client device 120.$a$, a request for a map of a geographic region. The map management server 110 is configured to provide to the client device 120.a, in response to the request for the map, an identification of tiles for the map.

Each tile server 130.b is configured to receive, from a client device 120.a, a request for tiles for a map. In response to this request, the tile server 130.b confirms, to the client device 120.a, whether the tile server 130.b is capable of providing the tiles. If the tile server 130.b is capable of providing the tiles, the tile server 130.b provides the tiles to the client device 120.a.

According to some example embodiments, the client device 120.1 in Maine, while executing the mapping application 125.1, requests a map of a part of Maine from the map management server 110. The map management server 110 notifies the client device 120.1 of the tiles that the client device 120.1 would need for the requested map (e.g., road tiles) and, in some cases, provides some other data (e.g., objects on the map). The client device 120.1 sends the request for the tiles to the Maine tile server 130.1. If the Maine tile server 130.1 successfully returns the requested tiles to the client device 120.1, the client device 120.1 displays the map of the part of Maine based on the tiles. If the Maine tile server 130.1 fails to return the requested tiles, the client device 120.1 provides the request for tiles to the other tile servers 130.2-4. The client device 120.1 receives from the New England tile server 130.2 (or, alternatively, one of the other tile servers 130.3-4) an indication that the New England tile server 130.2 is capable of providing the requested tiles. The client device 120.1 cancels, in response to the indication from the New England tile server 130.2, the request for the tiles from each other tile server 130.3-4. The client device 120.1 receives the tiles from the New England tile server 130.2. The client device 120.1 displays the map of the part of Maine based on the tiles.

In the example embodiments described above, there is a "waterfall" so if the first tile server (e.g., the closest tile server or the Maine tile server 130.1) does not have the tiles, the client device 120.1 sends the request to the other tile servers 130.2-4. Once the client device 120.1 receives a confirmation that one of the other tile servers 130.2-4 is capable of handling the request, the outstanding requests are cancelled.

According to some aspects, each tile server 130.b includes a manual cache and a least recently used (LRU) cache. The manual cache includes tiles for maps that are likely to be commonly requested, for example, road maps for major highways and large cities. For example, the Maine tile server 130.1 may include, in its manual cache, road tiles for the interstate highways (e.g., I-95 and I-295) in Maine and road tiles for the largest cities (e.g., Portland, Lewiston, and Bangor) in Maine. The LRU cache is based on recent requests. The LRU cache builds up a store of quickly accessible relevant tiles that can be overwritten. For example, if a festival occurs in Augusta, Me., and maps of Augusta are requested frequently from the Maine tile server 130.1, tiles representing Augusta may be stored in the LRU cache of the Maine tile server 130.1.

According to some examples, the client device 120.1 in Maine is accessing a satellite imagery map of Saco, Me. A user of the client device 120.1 (located in Maine) is collaboratively working on the map with a user of the client device 120.2 (located in Boston). The user of the client device 120.1 decides to change the base layer tiles from satellite imagery to roads. The client device 120.1 makes that change by pulling the road tiles for Saco from the Maine tile server 130.1. The change is pushed to the map management server 110. The user of the client device 120.2, which is located in Boston, opens the collaborative map. The client device 120.2 requests the map from the map management server 110, but gets the tiles from the New England tile server 130.2 instead of the Maine tile server 130.1 (as the New England tile server is located in Boston, which is more quickly accessible to the Boston client device 130.2 than the Maine tile server 130.1). The map management server 110 informs the Boston client device 130.2 to "pull road tiles," but does not specify whether the road tiles are to be pulled from the Maine tile server 130.1, the New England tile server 130.2, or another tile server.

The geographic locations provided in this document are examples and are not intended to limit the subject technology. The subject technology may be implemented with client devices and servers located in any geographic location(s), not necessarily those specified herein. Some aspects of the subject technology may be implemented on virtual machine(s) that lack geographic location(s).

Figure 2A:
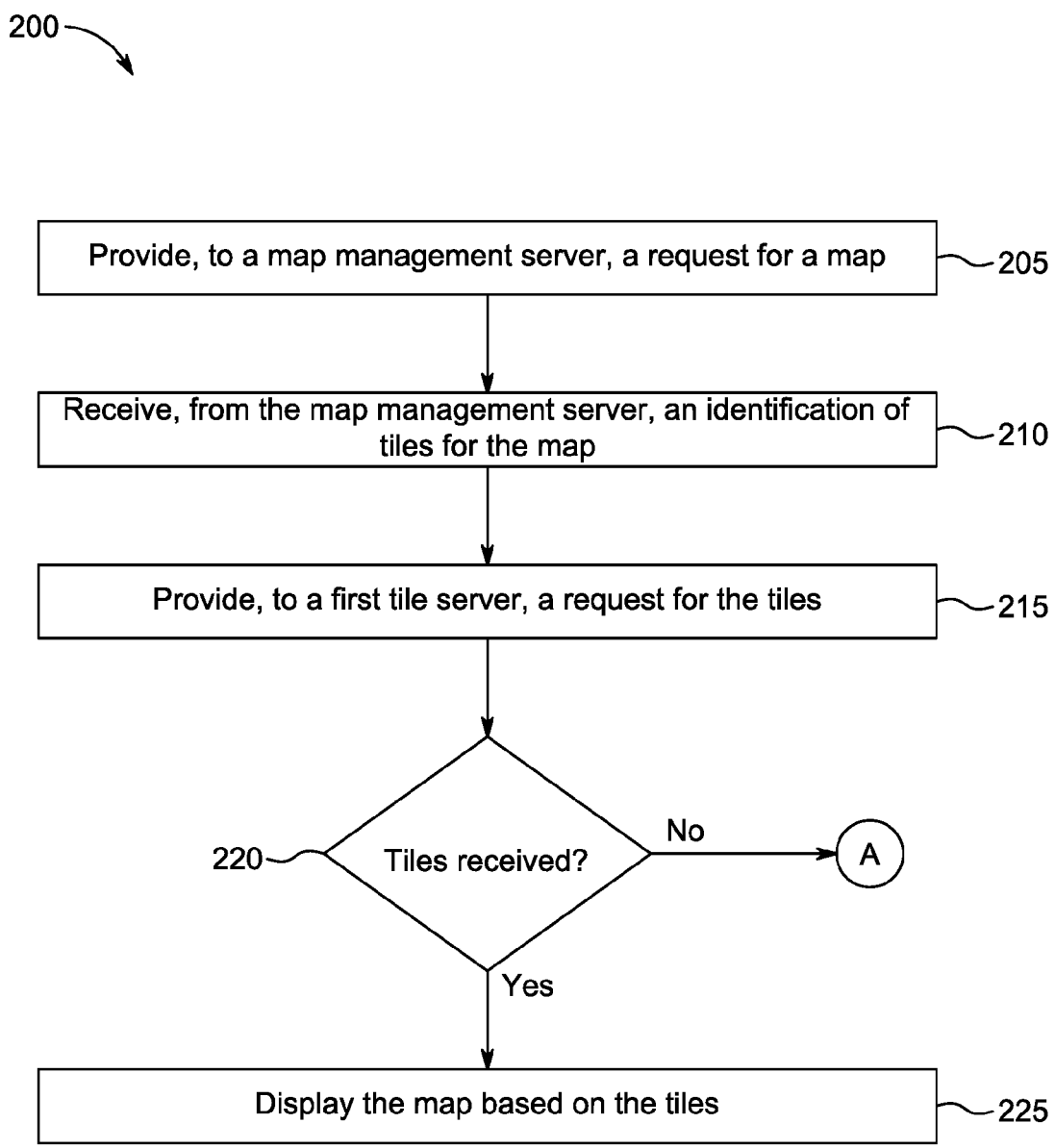
FIGS. 2A-2B is a flow chart illustrating an example method for displaying a map at a client device, according to some embodiments.
Figure 2B:
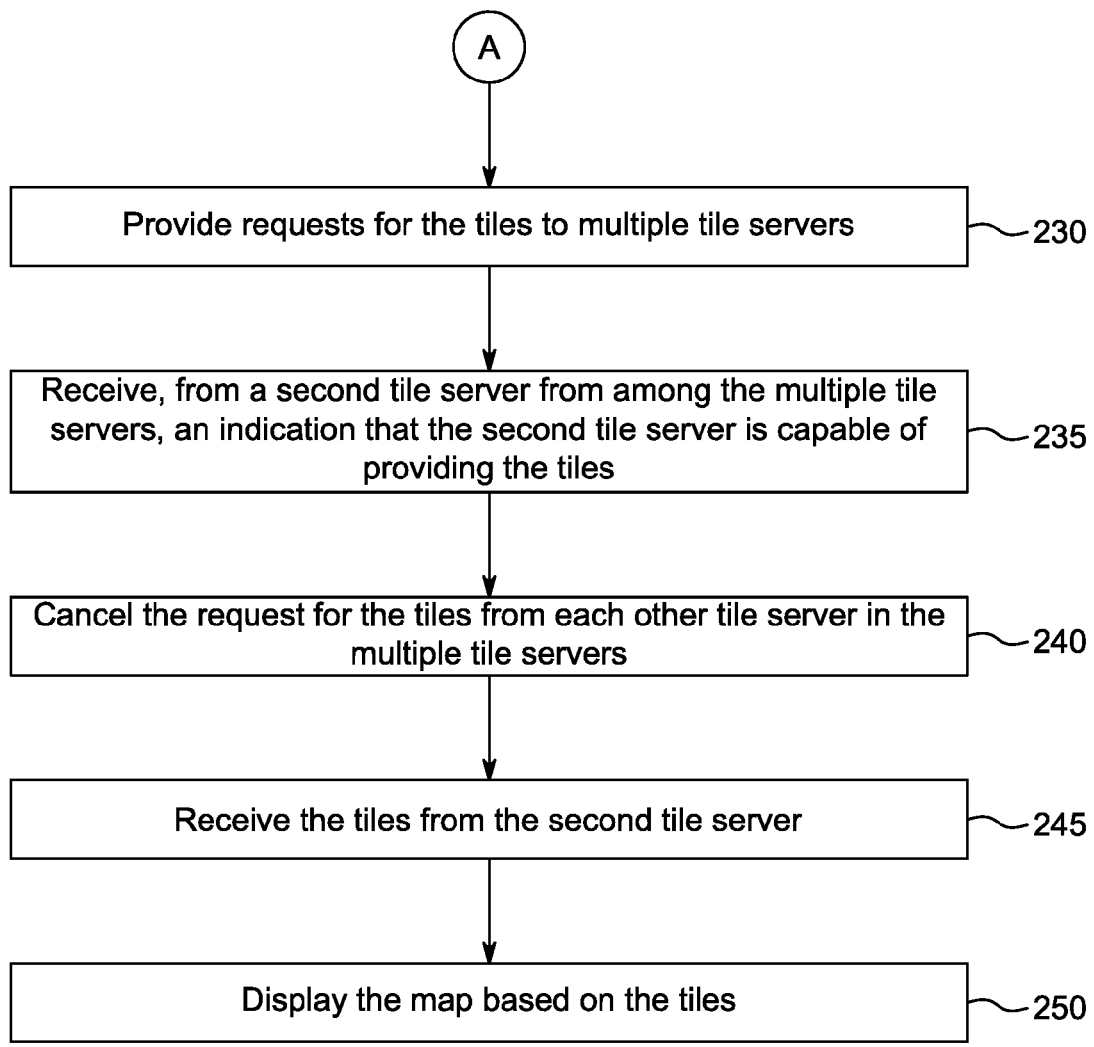

FIGS. 2A-2B are a flow chart illustrating an example method for displaying a map at the client device 120.1 executing the mapping application 125.1. The method 200 may be implemented at the client device 120.1 within the system 100, and is described herein as being implemented at the client device 120.1. However, in alternative embodiments, the method 200 may be implemented at other machine(s) or within other system(s). The method 200 is not limited to being implemented at the client device 120.1 as described herein.

As shown in FIG. 2A, at operation 205, the client device 120.1 provides, to the map management server 110 and from the client device 120.1, a request for a map of a geographic region.

At operation 210, the client device 120.1 receives, from the map management server 110 in response to the request for the map, an identification of tiles for the map.

At operation 215, the client device 120.1 provides, to a first tile server 130.1 and from the client device 120.1, a request for the tiles for the map.

At operation 220, the client device 120.1 determines whether the client device 120.1 receives, from the first tile server 130.1, the tiles in response to the request for the tiles. The client device 120.1 may determine that it has not received the tiles upon receiving a failure message from the first tile server 130.1 or upon failing to receive a response from the first tile server during a threshold time period (e.g., 1 second, 2 seconds, 10 seconds, etc.) after providing the request to the first tile server. If the tiles are received, the method 200 continues to operation 225. If the tiles are not received, the method 200 continues to operation 230 of FIG. 2B.

At operation 225, in response to receiving the tiles from the first tile server 130.1, the client device 120.1 provides for display of the map of the geographic region based on the tiles. After operation 225, the method 200 ends.

As shown in FIG. 2B, at operation 230, in response to failing to receive the tiles from the first tile server 130.1, the client device 120.1 provides multiple new requests for the tiles. Each of the new requests is directed to one of multiple tile servers 130.2-4.

At operation 235, the client device 120.1 receives, from a second tile server 130.2 from among the multiple tile servers 130.2-4, an indication that the second tile server 130.2 is capable of providing the tiles for the map.

At operation 240, the client device 120.1 cancels, in response to the indication from the second tile server 130.2, the request for the tiles from each other tile server 130.3-4 in the multiple tile servers 130.2-4.

At operation 245, the client device 120.1 receives the tiles from the second tile server 130.2.

At operation 250, the client device 120.1 provides for display of the map of the geographic region based on the tiles.

According to some embodiments, the first tile server is selected from a set of servers including the first tile server and the multiple tile servers. The first tile server is selected based on a geographic distance between the client device and the first tile server being less than a geographic distance between the client device and each other tile server in the set.

Figure 3:
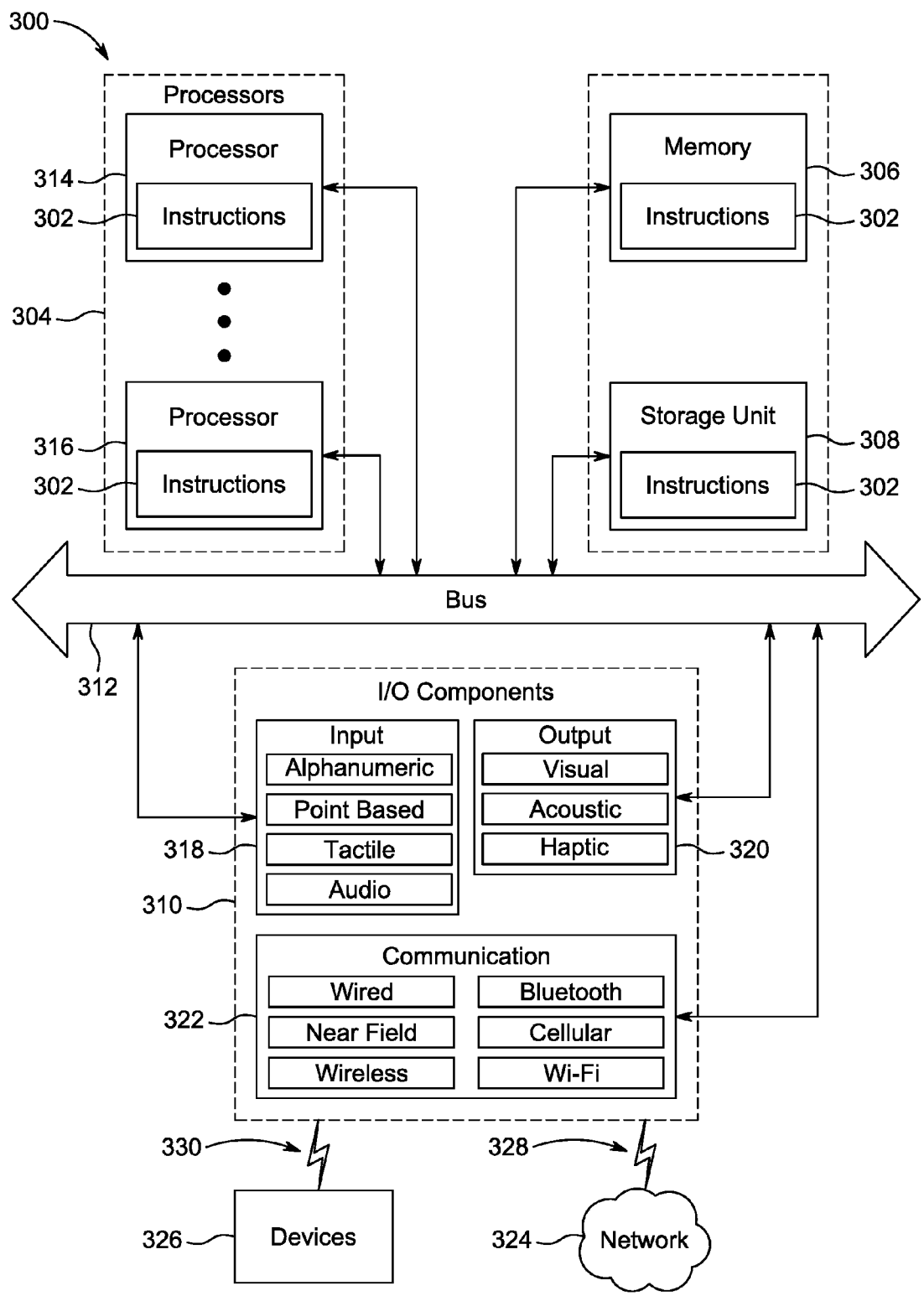
FIG. 3 is a block diagram illustrating components of a machine able to read instructions from a machine-readable medium, according to some embodiments.

FIG. 3 is a block diagram illustrating components of a machine 300, according to some example embodiments, able to read instructions from a machine-readable medium (e.g., a machine-readable storage medium) and perform any one or more of the methodologies discussed herein. The machine 300 may correspond to one or more of the map management server 110, the client device(s) 120.1-2, or the tile server(s) 130.1-4. Specifically, FIG. 3 shows a diagrammatic representation of the machine 300 in the example form of a system, within which instructions 302 (e.g., software, a program, an application, an applet, an app, a driver, or other executable code) for causing the machine 300 to perform any one or more of the methodologies discussed herein may be executed. For example, the instructions 302 include executable code that causes the machine 300 to execute the method 200. In this way, these instructions transform the general, non-programmed machine into a particular machine programmed to carry out the described and illustrated functions in the manner described herein. The machine 300 may operate as a standalone device or may be coupled (e.g., networked) to other machines.

By way of non-limiting example, the machine 300 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 302, sequentially or otherwise, that specify actions to be taken by machine 300. Further, while only a single machine 300 is illustrated, the term "machine" shall also be taken to include a collection of machines 300 that individually or jointly execute the instructions 302 to perform any one or more of the methodologies discussed herein.

The machine 300 may include processors 304, memory 306, storage unit 308 and I/O components 310, which may be configured to communicate with each other such as via a bus 312. In an example embodiment, the processors 304 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 314 and processor 316 that may execute instructions 302. The term "processor" is intended to include multi-core processors that may comprise two or more independent processors (sometimes referred to as "cores") that may execute instructions contemporaneously. Although FIG. 3 shows multiple processors, the machine 300 may include a single processor with a single core, a single processor with multiple cores (e.g., a multi-core process), multiple processors with a single core, multiple processors with multiples cores, or any combination thereof.

The memory 306 (e.g., a main memory or other memory storage) and the storage unit 308 are both accessible to the processors 304 such as via the bus 312. The memory 306 and the storage unit 308 store the instructions 302 embodying any one or more of the methodologies or functions described herein. The instructions 302 may also reside, completely or partially, within the memory 306, within the storage unit 308, within at least one of the processors 304 (e.g., within the processor's cache memory), or any suitable combination thereof, during execution thereof by the machine 300. Accordingly, the memory 306, the storage unit 308, and the memory of processors 304 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 302. The term "machine-readable medium" shall also be taken to include any medium, or combination of multiple media, that is capable of storing instructions (e.g., instructions 302) for execution by a machine (e.g., machine 300), such that the instructions, when executed by one or more processors of the machine 300 (e.g., processors 304), cause the machine 300 to perform any one or more of the methodologies described herein (e.g., methods 200 and 300). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 310 may include a wide variety of components to receive input, provide output, produce output, transmit information, exchange information, capture measurements, and so on. The specific I/O components 310 that are included in a particular machine will depend on the type of machine. For example, portable machines such as mobile phones will likely include a touch input device or other such input mechanisms, while a headless server machine will likely not include such a touch input device. It will be appreciated that the I/O components 310 may include many other components that are not specifically shown in FIG. 3. The I/O components 310 are grouped according to functionality merely for simplifying the following discussion and the grouping is in no way limiting. In various example embodiments, the I/O components 310 may include input components 318 and output components 320. The input components 318 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 320 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 310 may include communication components 322 operable to couple the machine 300 to a network 324 or devices 326 via coupling 328 and coupling 330, respectively. For example, the communication components 322 may include a network interface component or other suitable device to interface with the network 324. In further examples, communication components 322 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 326 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method implemented at a client device, the method comprising:
   providing, to a map management server and from the client device, a request for a map of a geographic region;
   receiving, from the map management server in response to the request for the map, an identification of tiles for the map;
   providing, to a first tile server and from the client device, a request for the tiles for the map;
   in response to receiving the tiles from the first tile server:
      providing for display, at the client device, of the map of the geographic region based on the tiles; and
   in response to failing to receive the tiles from the first tile server:
      providing a plurality of requests for the tiles for the map, each request from the plurality of request being directed to one of a plurality of tile servers;
      receiving, from a second tile server from among the plurality of tile servers, an indication that the second tile server is capable of providing the tiles for the map;
      cancelling, in response to the indication from the second tile server, the request for the tiles from each other tile server in the plurality of tile servers;
      receiving the tiles from the second tile server; and
      providing for display, at the client device, of the map of the geographic region based on the tiles.

2. The method of claim 1, wherein failing to receive the tiles from the first tile server comprises receiving a failure message from the first tile server.

3. The method of claim 1, wherein failing to receive the tiles from the first tile server comprises failing to receive a response to the request to the first tile server during a threshold time period after providing the request to the first tile server.

4. The method of claim 1, further comprising:
selecting the first tile server from a set of tile servers based on a geographic distance between the client device and the first tile server being less than a geographic distance between the client device and each other tile server from among the set of tile servers.

5. The method of claim 4, wherein the set of tile servers comprises the first tile server and the plurality of tile servers.

6. The method of claim 1, wherein each tile from among the tiles tile stores a portion of the map at a given zoom level as an image taking up a predefined area measured in pixels.

7. The method of claim 1, wherein each of the plurality of tile servers stores geographic information for a different geographic area.

8. A non-transitory machine-readable medium storing instruction which, when executed by one or more processors of a client device, cause the client device to implement operations comprising:
providing, to a map management server and from the client device, a request for a map of a geographic region;
receiving, from the map management server in response to the request for the map, an identification of tiles for the map;
providing, to a first tile server and from the client device, a request for the tiles for the map;
in response to receiving the tiles from the first tile server:
providing for display, at the client device, of the map of the geographic region based on the tiles; and
in response to failing to receive the tiles from the first tile server:
providing a plurality of requests for the tiles for the map, each request from the plurality of request being directed to one of a plurality of tile servers;
receiving, from a second tile server from among the plurality of tile servers, an indication that the second tile server is capable of providing the tiles for the map;
cancelling, in response to the indication from the second tile server, the request for the tiles from each other tile server in the plurality of tile servers;
receiving the tiles from the second tile server; and
providing for display, at the client device, of the map of the geographic region based on the tiles.

9. The machine-readable medium of claim 8, wherein failing to receive the tiles from the first tile server comprises receiving a failure message from the first tile server.

10. The machine-readable medium of claim 8, wherein failing to receive the tiles from the first tile server comprises failing to receive a response to the request to the first tile server during a threshold time period after providing the request to the first tile server.

11. The machine-readable medium of claim 8, the operations further comprising:
selecting the first tile server from a set of tile servers based on a geographic distance between the client device and the first tile server being less than a geographic distance between the client device and each other tile server from among the set of tile servers.

12. The machine-readable medium of claim 11, wherein the set of tile servers comprises the first tile server and the plurality of tile servers.

13. The machine-readable medium of claim 8, wherein each tile from among the tiles tile stores a portion of the map at a given zoom level as an image taking up a predefined area measured in pixels.

14. The machine-readable medium of claim 8, wherein each of the plurality of tile servers stores geographic information for a different geographic area.

15. A client device comprising:
one or more processors; and
a memory storing instruction which, when executed by the one or more processors, cause the client device to implement operations comprising:
providing, to a map management server and from the client device, a request for a map of a geographic region;
receiving, from the map management server in response to the request for the map, an identification of tiles for the map;
providing, to a first tile server and from the client device, a request for the tiles for the map;
in response to receiving the tiles from the first tile server:
providing for display, at the client device, of the map of the geographic region based on the tiles; and
in response to failing to receive the tiles from the first tile server:
providing a plurality of requests for the tiles for the map, each request from the plurality of request being directed to one of a plurality of tile servers:
receiving, from a second tile server from among the plurality of tile servers, an indication that the second tile server is capable of providing the tiles for the map;
cancelling, in response to the indication from the second tile server, the request for the tiles from each other tile server in the plurality of tile servers;
receiving the tiles from the second tile server; and
providing for display, at the client device, of the map of the geographic region based on the tiles.

16. The client device of claim 15, wherein failing to receive the tiles from the first tile server comprises receiving a failure message from the first tile server.

17. The client device of claim 15, wherein failing to receive the tiles from the first tile server comprises failing to receive a response to the request to the first tile server during a threshold time period after providing the request to the first tile server.

* * * * *

UNITED STATES PATENT AND TRADEMARK OFFICE
CERTIFICATE OF CORRECTION

PATENT NO. : 9,686,357 B1
APPLICATION NO. : 15/349794
DATED : June 20, 2017
INVENTOR(S) : Waldrep et al.

Page 1 of 1

It is certified that error appears in the above-identified patent and that said Letters Patent is hereby corrected as shown below:

In the Claims

In Column 12, Line 37, in Claim 15, delete "servers:" and insert --servers;-- therefor Signed and Sealed this
Tenth Day of April, 2018

Andrei Iancu
*Director of the United States Patent and Trademark Office*